United States Patent
Wu

(10) Patent No.: US 6,829,739 B1
(45) Date of Patent: Dec. 7, 2004

(54) APPARATUS AND METHOD FOR DATA BUFFERING

(75) Inventor: Daniel Wu, Mountain View, CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 640 days.

(21) Appl. No.: 09/636,209

(22) Filed: Aug. 10, 2000

(51) Int. Cl.[7] .............................................. G11C 29/00
(52) U.S. Cl. ...................................................... 714/719
(58) Field of Search ................................ 714/718, 719, 714/805, 807, 819

(56) References Cited

U.S. PATENT DOCUMENTS

| | | | | |
|---|---|---|---|---|
| 4,494,226 A | * | 1/1985 | Hazel et al. ............... | 369/44.26 |
| 5,475,820 A | * | 12/1995 | Natrasevschi et al. ...... | 711/100 |
| 5,537,416 A | * | 7/1996 | MacDonald et al. .......... | 371/32 |
| 5,613,063 A | * | 3/1997 | Eustace et al. ......... | 395/183.14 |
| 5,623,507 A | * | 4/1997 | Burns et al. ............... | 371/40.3 |
| 5,706,032 A | * | 1/1998 | Chang et al. ........... | 395/182.03 |
| 5,825,736 A | * | 10/1998 | Kimura et al. ............ | 369/47.13 |
| 6,009,542 A | * | 12/1999 | Koller et al. .................. | 714/53 |
| 6,052,743 A | * | 4/2000 | Schwan et al. ................ | 710/23 |
| 6,295,619 B1 | * | 9/2001 | Hasbun et al. .............. | 714/719 |

FOREIGN PATENT DOCUMENTS

JP 04100338 A * 4/1992 ............. H04L/1/00

OTHER PUBLICATIONS

An FPGA controlled WDM buffer memory Wu, L.; Chao, H.J.; Zhao, X.J.; Zhao, Y.; Chai, Y.; Zhang, J.P.; Choa, F.S.; Lase and Electro–Optics, 2000. (CLEO 2000). Conference on , 2000 Page(s): 340–341.* van Straten, "Harddrive Related Terms and Tricks," Copyright © 1997.*

* cited by examiner

Primary Examiner—Albert Decady
Assistant Examiner—Cynthia Britt

(57) ABSTRACT

Memory segment overwrites are detected by providing a redundant header at the end of a segment and comparing a redundant header to an initial header. In specific embodiments, overwrites may be detected both after segment writes and prior to buffer reads. In further embodiments, some header overwrite errors may be corrected to increase the mean time between failure of a logic system.

16 Claims, 4 Drawing Sheets

APPARATUS AND METHOD FOR DATA BUFFERING

FIELD OF THE INVENTION

The present invention relates to data storage in data processing devices. More particularly, the present invention relates to methods and apparatus useful in data storage to detect and isolate data corruption due to buffer overwrites.

BACKGROUND OF THE INVENTION

There is a large body of previous work regarding buffer and memory management and techniques useful for insuring memory integrity and detecting errors.

Cyclical Redundancy Checking (CRC), checksums, storage of "magic numbers" in a data set, etc., are all known methods for attempting to detect memory corruption.

One situation in which memory corruption can occur is out-of-bounds memory overwrite. In many programming or operating system environments, it can be difficult to ensure that all machine-executed memory writes only write to memory allocated to the particular process or subroutine doing the writing. Consider a case where a physical memory is divided up into n separate buffers, B1 through Bn. Oftentimes, some or all of these buffers may be stored essentially contiguously (though not necessarily in order), one after the other, in the memory space.

In some logic system environments, it is difficult to ensure that every memory write to a buffer neither exceeds the buffer size nor falls outside a particular address range. In these systems, a write to buffer B5 may cross the buffer boundary and overwrite data in an adjacent buffer (such as B3). Oftentimes, this erroneous overwrite may not be detected until a subsequent attempt to access data in the overwritten buffer. At that point, it is difficult to determine which process caused the erroneous overwrite and even the attempt to do so may involve a possibly unsuccessful complex recreation of the error condition in a lab, followed by debugging.

SUMMARY OF THE INVENTION

The present invention may be understood in the context of a buffer or memory segment system in a memory storage (such as a RAM) or recording device (such as a disk drive). While the invention is discussed in terms of buffers, the invention has applications to similar memory structures, however named.

According to specific embodiments, the invention involves one or more buffers or segments having at least three parts: an initial area (usually that contains traditional link and system information, which may be referred to as a first header), a middle area that contains the data part of the buffer and possible other buffer structures, and a final area that contains essentially the same information as the initial area (which may be referred to as a second or redundant header).

According to the invention, after the data part of the buffer is written to, the buffer is checked by comparing relevant parts of the final portion to the first portion. If this compare indicates that the final portion is different from the first portion, an overwrite error may have occurred. If the overwrite data amount was longer than the second header, one or more buffers subsequent in the address space may have been erroneously overwritten. The overwrite error is thus both detected and isolated during the operation that caused the error.

This compare according to the invention is especially important for legacy algorithms that use arithmetic pointer calculations in a loop of some kind. In various embodiments, how frequently a compare is performed can be varied in different system designs.

In a further embodiment of the invention, a buffer can be repaired. This can particularly be done when a buffer is requested from a queue manager. In such a case, a validation (such as CRC, a checksum, or any other type of data integrity validation) is performed on the first and/or last parts of the buffer, and the section validated is then copied into the corrupted section. While this repair will not correct all overwrite errors, many simpler errors can be corrected and thereby the mean time between failures (MTBF) desirably will increase.

In a specific embodiment, the first portions and final portions of buffers according to the invention normally will be identical unless an overwrite error has occurred. This will lead to simpler design. However, it will be understood to practitioners in the art from the teachings herein that what is important is that a compare of the first and last portions should indicate if an overwrite has occurred. Thus data may be encoded or formatted somewhat differently in each portion, as long as the essential data is present or can be derived to perform a compare and/or a repair.

While the invention has particular applications in the field of legacy real-time embedded software systems, using the teachings provided herein, it will be understood by those of skill in the art, that the methods and/or apparatus according to the present invention can be advantageously used in other data storage situations. It also will be understood from the teachings herein that the invention can be adapted to many different memory systems and buffer structures, including structures where segments are, for example, not absolutely contiguous.

The invention will be better understood with reference to the following drawings and detailed descriptions. In different figures, similarly numbered items are intended to represent similar functions within the scope of the teachings provided herein. In some of the drawings and detailed descriptions below, the present invention is described in terms of the important independent embodiment of a multimedia message system. This should not necessarily be taken to limit the invention, which, using the teachings provided herein, can be applied to other data accessing situations.

DESCRIPTION OF SPECIFIC EMBODIMENTS

Figure 1:
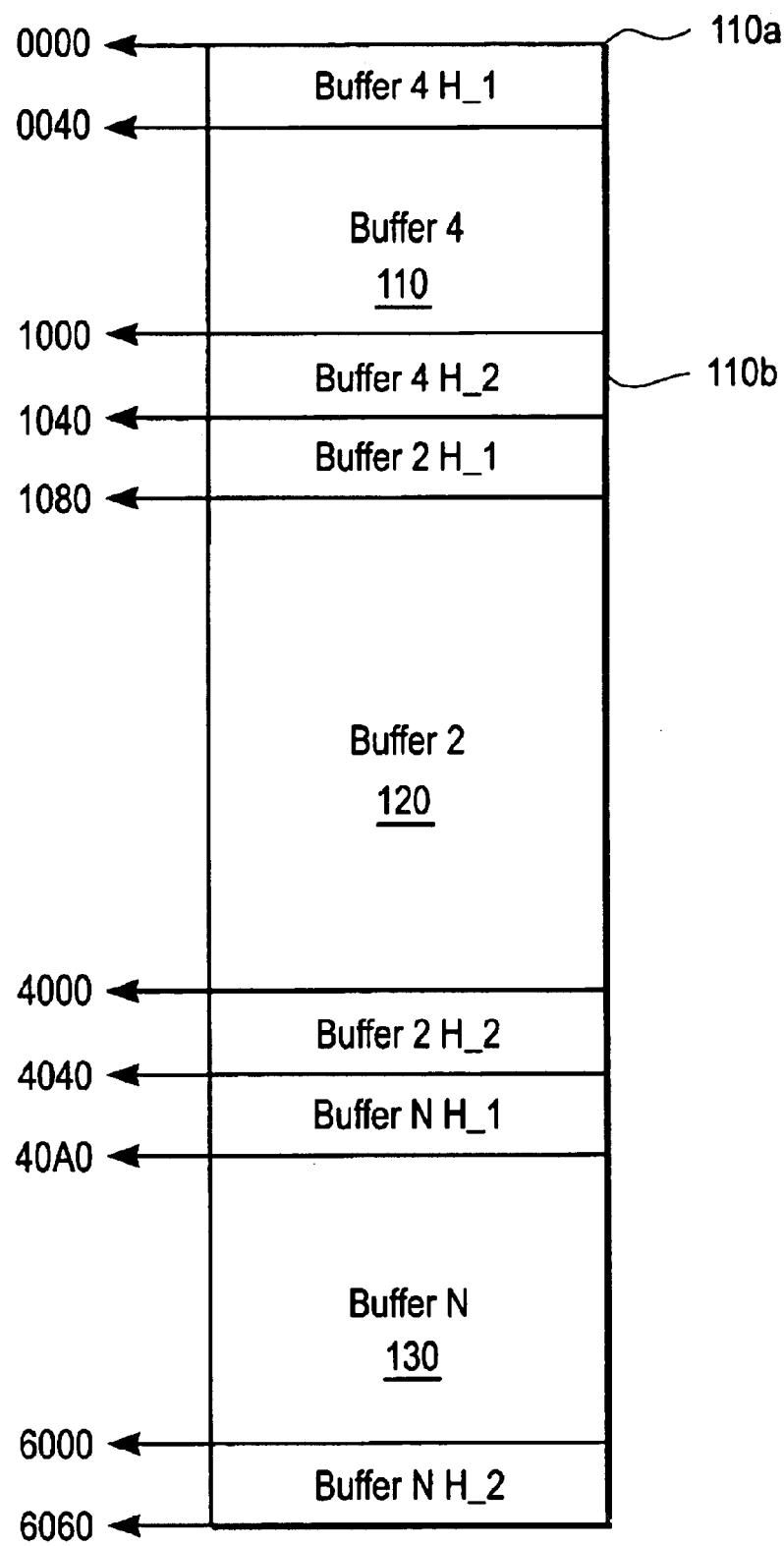
FIG. 1 is a simple block diagram showing a logical buffer organization according to specific embodiments of the invention.

To aid understanding by the reader, the invention will be explained in the context of various specific memory system configurations as examples. FIG. 1 is a simple block diagram showing a logical buffer organization according to specific embodiments of the invention. As shown in FIG. 1, a buffer system according to specific embodiments of the invention, includes a number of buffers 110, 120 and 130. These buffers are stored in a memory space substantially contiguously, with the address of the final location of one buffer followed (either immediately or with additional space between) by the beginning of another buffer. (As will be understood to practitioners in the art, this logical memory organization may be implemented in a number of different physical organizations, using memory mapping, paging, address translation, etc.) According to the invention, each buffer includes a header portion H_1 and a redundant header portion H_2, at each end of the data portion of the buffer.

As will be understood in the art, a common overwrite error may occur when data is being written into a buffer such as 110, and the address logic performing the writing indicates an address beyond the boundary of the data portion. In some prior art system, such an overwrite would quickly corrupt data in a different buffer. However, according to the current invention, an overwrite will first overwrite the redundant header, which can then be detected as discussed herein.

Figure 2:
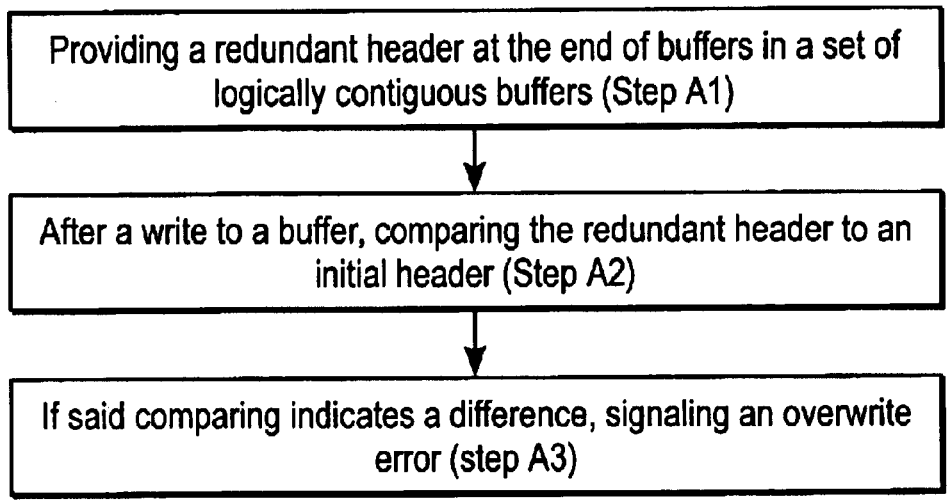
FIG. 2 is a flowchart illustrating a general method for detecting memory errors according to embodiments of the invention.

FIG. 2 is a flowchart illustrating a general method for detecting memory errors according to embodiments of the invention. This general method is provided to address the situations discussed above. The method may be understood as beginning upon providing a redundant header at the end of buffers in a set of logically contiguous buffers (Step A1). After a write to a buffer, the redundant header is compared to an initial header (Step A2). If this comparison indicates a difference, an overwrite error is signaled (Step A3).

Figure 3:
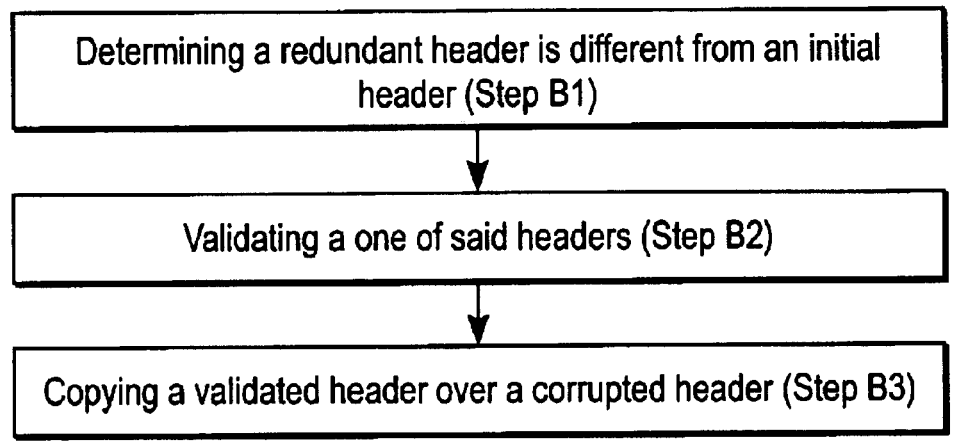
FIG. 3 is a flowchart illustrating a general method for correction of header errors according to embodiments of the invention.

A method for repairing a damaged memory segment according to further aspects of the invention is shown in FIG. 3. This method may be understood as beginning upon determining a redundant header is different from an initial header (Step B1). At that point, one of the headers is validated, such as by checking whether a pointer is within a valid range, checking a CRC or checksum, etc. (Step B2). If validated, the validated portion may be copied over the other corrupted portion (Step B3).

Figure 4:
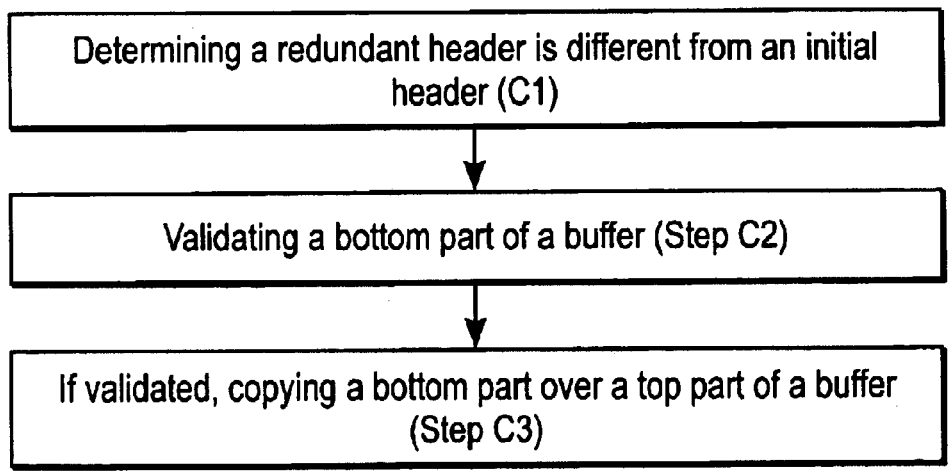
FIG. 4 is a flowchart illustrating a general method for correction of header errors according to embodiments of the invention.

An alternative method for repairing a damaged memory segment according to further aspects of the invention is shown in FIG. 4. This method may be used when the top part of a header has been invalidated by an overwrite in a different buffer. The method may be understood as beginning upon determining a redundant header is different from an initial header (Step C1). At that point, the bottom part of the buffer is validated, such as by checking whether a pointer is within a valid range, checking a CRC or checksum, etc. (Step C2). If validated, the validated bottom part may be copied over the corrupted top part of the buffer (Step C3).

It will be understood to practitioners in the art and from the teaching provided herein that the steps of this method as herein described may be performed in various system configurations and in orders somewhat different from what is specifically illustrated. It will be further understood to practitioners in the art and from the teaching provided herein that the steps of this method, in various embodiments, may be performed in different orders.

A buffer manager according to the invention may be implemented at various logic levels in a software environment. For example, aspects of the invention can be implemented in low level buffer allocation logic (which may be a system resource, usually implemented in a low-level programming language such as C or assembly). In a such a manager, a system according to the invention will be particularly effective in detecting overruns quickly and repairing them and therefore increasing the MTBF. The invention may also be implemented in application level software (in a variety of programming languages). When implemented in an addressing system, a system according to the invention will be particularly effective in isolating the "culprit" that causes an overwrite to occur. To be able to both quickly repair overruns and to detect culprits, aspects of the present invention may be implemented in both a memory manager and in address logic software.

The present invention has thus far been described in terms of general methods and devices. The previous description is believed to be a full and complete description sufficient to allow an ordinary practitioner in the art to make and use the invention. It will be understood to those of skill in the art from the teachings provided herein that the described invention can be implemented in a wide variety of specific data processing system environments and logical systems (such as UNIX, Windows, Solaris, Oracle, etc.) using a wide variety of programming languages (such as SQL, Visual Basic, Pascal, C, C++, Basic, Java, etc.) and wide variety of file formats.

What follows are descriptions of example systems and methods that embody various aspects of the present invention. This following discussion is included, in part, in order to disclose particularly preferred modes presently contemplated for practicing the invention. It is intended, however, that the previous discussion and the claims not be limited by examples provided herein. It is further intended that the attached claims be read broadly in light of the teachings provided herein. Where specific examples are described in detail, no inference should necessarily be drawn to exclude other examples known in the art or to exclude examples described or mentioned briefly from the broad description of the invention or the language of the claims. It is therefore intended that the invention not be limited except as provided in the attached claims and equivalents thereof.

Software System Example

Logic according to the present invention may be included either in operating system logic or application logic. As known in the art, this logic may be part executable code that is either stored as software, firmware, or part of the hardware logic of an information device.

In an information processing system according to the invention, the invention may be embodied as modified buffer allocation and write logic, and example of which is illustrated below. For example, buffer write logic according to the invention can be understood by the following pseudo code examples.

Example Logic Flow Buffer Writes

According to the present invention, writes to buffers may be validated as described in the example below. As will be understood to practitioners in the art from the teachings provided herein, in legacy system, it is a common practice to: first allocate a buffer from a system pool; fill in the buffer with some data (in these examples, the data is from some database); and possibly do some massaging of the data at the same time. This may be a very high priority task. After this task is complete, the buffer is then sent to another process for more detail processing. This could be a low priority task. After the processing is done, the process that did the detail processing will release the buffer back into the pool.

Example Prior Art Legacy System Write
    Buffer_Pointer1=Allocate_Memory
    Index_Pointer1=Buffer_Pointer1
    DBentry_Pointer1=Points to beginning of database entry 1
    Loop
      Content of Index_Pointer1=Content of DBentry_Pointer1
      Index_Pointer1 incremented to next memory location
        DBentry_Pointer1 incremented to next memory location

```
            Break out of loop if content of DBentry_Pointer1 is
               Null
        endloop
        Send Buffer_Pointer1 to another process
Example Buffer Write According to the Invention
        Buffer_Pointer1=Allocate_Memory( )  //Pointer is
returned by system function that provides the first location
of the buffer.
        Index_Pointer1=Buffer_Pointer1 // Set the index pointer
to the beginning of the buffer.
        DBentry_Pointer1=Points to beginning of database entry
1
    Loop
        Same as Legacy System Write above
    endloop
    verify_memory(Buffer_Pointer1) //At end of write to the
buffer, verify the buffer.
        Send Buffer_Pointer1 to another process
    As can be seen in the example above, in this embodiment,
the system can perform a verification at the end of the loop
and not at every write.
verify-memory Function Description
    An example verify_memory function, according to the
invention, follows:
    if pointer in first heading is not within memory pool range
(or otherwise not validated)
    if pointer in second heading is within memory pool range
        (or otherwise not validated)
        copy second heading to first heading; //repair
    endif
    dump calling stack to debug area
    send errata message to appropriate process
    elseif pointer in second heading is not within memory
pool range (or otherwise not validated)
    if pointer in first heading is within memory pool range(or
        otherwise not validated)
        copy first heading to second heading; //repair
    endif
    dump calling stack to debug area
    send errata message to appropriate process
    endif
```

In the example shown above, the repair may again overwrite the data that was erroneously placed in the header area during a write operation. The intention of the repair is to make the overall buffer structure still valid, even if some of the data overwritten into the buffer is corrupted.

A system according to the invention may also perform a similar verify when a buffer is requested or returned. How a system is implemented will depend on how much real-time overhead processing a system designer wishes to add for buffer validation. An advantage to validation on buffer allocation is that the validation can potentially repair an overwrite by a legacy process or legacy logic that does not include the verification routine during the write operation. This can extend the MTBF for unrecoverable failures.

Processor Space Illustration

Figure 5:
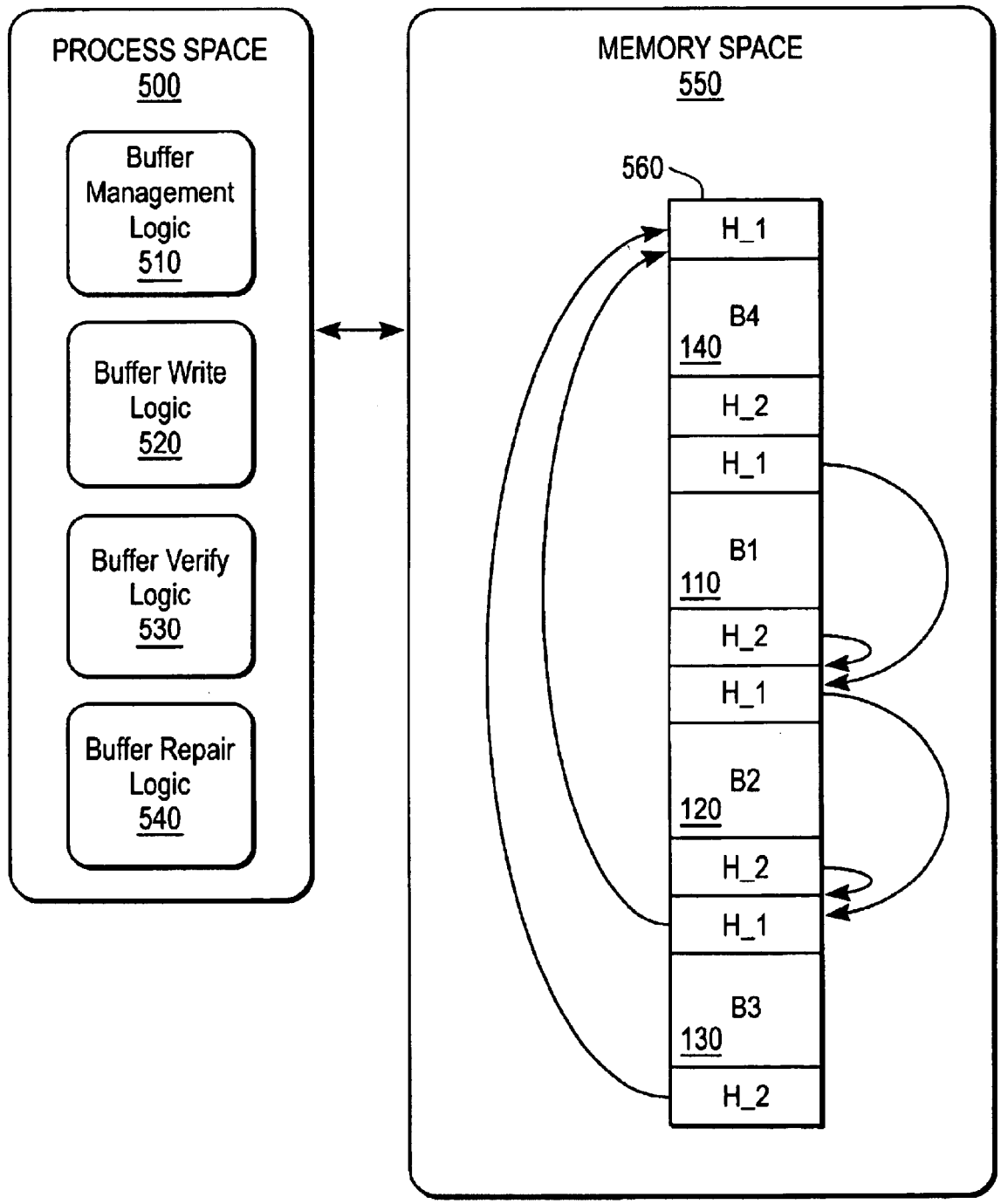
FIG. 5 is a simple block diagram showing a process space including buffer logic according to specific embodiments of the invention.

FIG. 5 is a simple block diagram showing a process space including buffer logic according to specific embodiments of the invention. It will be apparent to those of skill in the art from the teachings herein that many variations in the details of operation of this example lie within the scope of the invention. In this figure, a processor space 500 is shown. Buffer management logic 510 allocates buffers as needed by other processes or system functions and also manages buffers returned or released by other process. This logic, according to the invention, provides buffers with headers, as known in the art and with redundant headers at the end of the buffers in accordance with embodiments of the present invention.

The buffer management logic 510 may optionally invoke the buffer verify logic 530 to verify the allocated buffer before it is given to the requested process. If the buffer is not valid, the buffer repair logic 540 can be called to attempt the repair before it is given to the buffer requesting process. If a buffer is released or returned, the buffer management logic 510 can optionally invoke the buffer verify logic 530 and if appropriate the buffer repair logic at 540. Buffer write logic 520 is invoked during a buffer write operation. This logic, which may be part of operating system memory management logic or may be part of applications logic, calls buffer verify logic 530, which performs the buffer verify and may optionally perform the header repair by invoking buffer repair logic 540. As will be understood in the art, processes in processor space 500 establish and interact with buffers in a memory space 550. An alternative representation of buffers established according to the invention is illustrated by 560.

General Computer Embodiment

Figure 6:
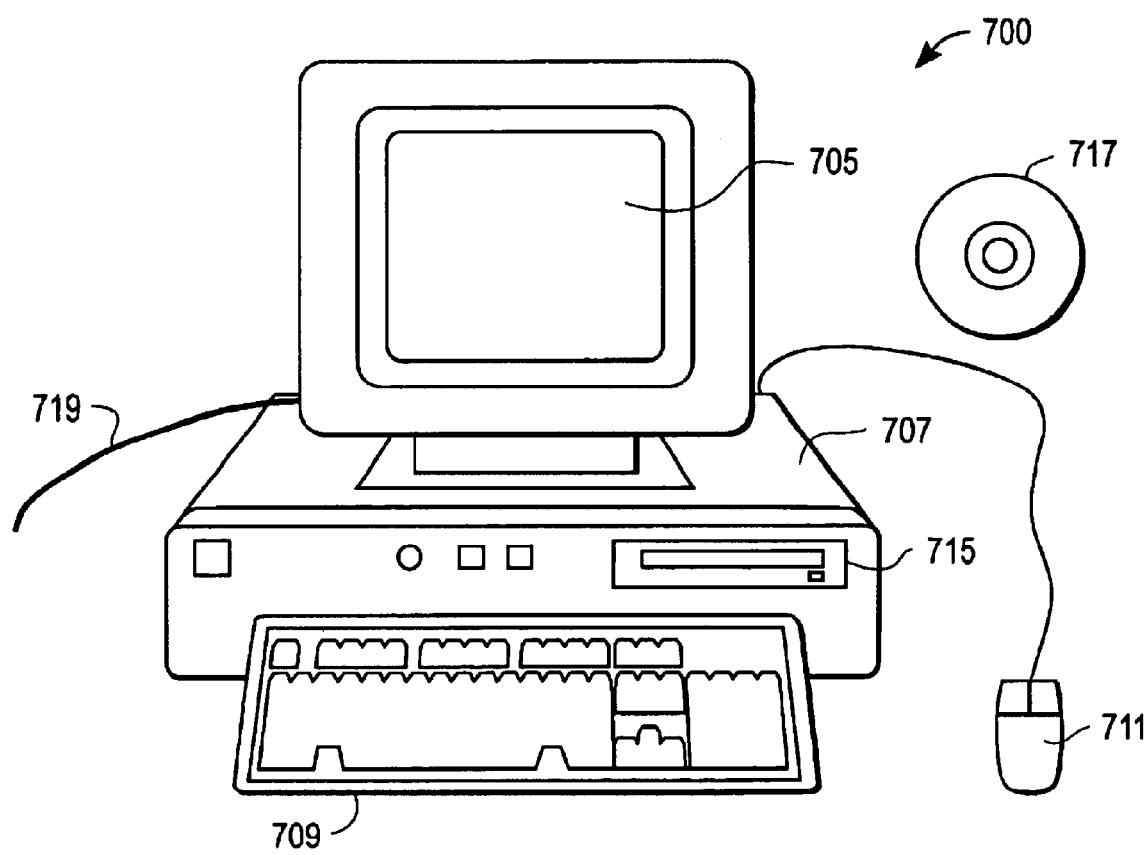
FIG. 6 is a diagram illustrating an example computer device that can embody aspects of the present invention.

FIG. 6 shows an information appliance (or digital device) 700 that may be understood as a logical apparatus that can read instructions from media 717 and/or network port 719. Apparatus 700 can thereafter use those instructions to direct server or client logic, as understood in the art, to embody aspects of the invention. One type of logical apparatus that may embody the invention is a computer system as illustrated in 700, containing CPU 707, optional input devices 709 and 711, disk drives 715 and optional monitor 705. Fixed media 717 may be used to program such a system and may represent a disk-type optical or magnetic media, magnetic tape, solid state memory, etc.. The invention may be embodied in whole or in part as software recorded on this fixed media. Communication port 719 may also be used to initially receive instructions that are used to program such a system and may represent any type of communication connection.

The invention also may be embodied in whole or in part within the circuitry of an application specific integrated circuit (ASIC) or a programmable logic device (PLD). In such a case, the invention may be embodied in a computer understandable descriptor language which may be used to create an ASIC or PLD that operates as herein described.

Other Embodiments

The invention has now been described with reference to specific embodiments. Other embodiments will be apparent to those of skill in the art. It is understood that the examples and embodiments described herein are for illustrative purposes only and that various modifications or changes in light thereof will be suggested by the teachings herein to persons skilled in the art and are to be included within the spirit and purview of this application and scope of the claims. All publications, patents, and patent applications cited herein are hereby incorporated by reference in their entirety for all purposes.

What is claimed is:

1. A method for detecting memory corruption comprising:
    performing a data write to a predefined memory segment;
    after said write, comparing a redundant portion at the end of said segment to an initial header portion of said segment;
    if said comparing indicates that said redundant portion and said initial portion are not the same, signaling an overwrite error.

2. A method according to claim 1 wherein said signaling occurs in real-time and can detect and isolate a process causing said erroneous overwrite.

3. A method according to claim 1 wherein said initial portion includes a memory segment header and includes a pointer to a next segment in a linked list.

4. A method according to claim 1 wherein said memory segment is a buffer in a buffer system comprised of a plurality of buffers.

5. A method according to claim 1 further comprising:

if said comparing indicates a difference between said initial portion and said redundant portion, validating one of said portions and copying a validated portion to the location of a non-validated portion.

6. A method according to claim 1 further comprising:

dumping the call stack to isolate the error to the routine that caused the rewrite.

7. A method for allocating memory segments so as to provide for detecting memory corruption comprising:

at initial memory segment allocation, providing a redundant portion at the logical end of a memory segment, said redundant portion containing data derived from an initial header portion of said segment; and providing a verify memory routine for comparing said redundant portion to said initial portion to determine whether said initial portion and said redundant portion are the same and therefore if an erroneous overwrite has occurred.

8. A method for detecting and correcting memory corruption comprising:

upon accessing a memory segment logically contiguous another memory segment, comparing a redundant portion at the end of said segment to an initial header portion of said segment;

if said comparing indicates a difference between said segments, determining which portion is valid; and from said valid portion, reconstructing said invalid portion by copying over a portion of said valid portion to said invalid portion.

9. A method according to claim 8 wherein said comparing determines if said initial portion and said redundant portion are identical.

10. A method according to claim 8 wherein said determining which portion is valid comprises for each portion comparing stored data in that portion against a check sum value.

11. A method according to claim 8 wherein said determining which portion is valid comprises for each portion determining if a pointer in that portion is within a memory pool range.

12. A buffer system able to detect buffer corruption comprising:

a plurality of buffers with logically contiguous addressing;

at least one buffer comprising an initial portion and a final portion;

a detector for determining that a write has been performed on said at least one buffer;

a comparator for comparing said initial portion and said final portion after a write; and a signaler for sending an alert when said comparator indicates an erroneous overwrite has occurred wherein said signaler can cause stack to be dumped and other debug information to be collected.

13. An apparatus according to claim 12 wherein said apparatus is embodied into a fixed media containing logic instructions that when loaded into appropriately configured computer systems will cause the system to embody said buffer system.

14. An information processing system comprising:

a process space containing a plurality of executable logic components;

buffer allocation logic able to establish a buffer structure in a memory space;

buffer write logic able to write data to buffers; and buffer verify logic able to determine if an erroneous overwrite has occurred by comparing a final portion and an initial portion of a written to buffer.

15. The device according to claim 14 further comprising:

a buffer structure comprising a series of linked memory segments arranged in a memory space.

16. An information processing system comprising:

a process space containing a plurality of executable logic components;

buffer allocation logic able to establish a buffer structure in a memory space;

buffer write logic able to write data to buffers;

buffer verify logic able to determine if an erroneous overwrite has occurred by comparing a final portion and an initial portion of a written to buffer; and repair logic able to repair an overwritten portion.

* * * * *